United States Patent [19]

Abrams et al.

[11] Patent Number: 5,479,582
[45] Date of Patent: Dec. 26, 1995

[54] MESSAGE-ORIENTED BANK CONTROLLER INTERFACE

[75] Inventors: Lane J. Abrams, Highland Park; Inars Gruntals, Mendham; Hoo-Yin Khoe, Parsippany; Kevin Loughran, Township of Randolph, Morris County, all of N.J.

[73] Assignee: AT&T Corp., Murray Hill, N.J.

[21] Appl. No.: 973,585

[22] Filed: Nov. 6, 1992

Related U.S. Application Data

[63] Continuation of Ser. No. 603,492, Oct. 26, 1990, abandoned.

[51] Int. Cl.⁶ .................................................. G06F 13/00
[52] U.S. Cl. ..................... 395/821; 395/200.2; 395/885; 364/238.3; 364/240.9; 364/DIG. 1
[58] Field of Search ............................. 364/200, 900; 395/200, 275; 398/275, 84, 885, 200

[56] References Cited

U.S. PATENT DOCUMENTS

| | | | |
|---|---|---|---|
| 4,218,740 | 8/1980 | Bennett et al. | 364/200 |
| 4,458,314 | 7/1984 | Grimes | 364/200 |
| 4,468,733 | 8/1984 | Oka et al. | 364/200 |
| 4,538,224 | 8/1985 | Peterson | 364/200 |
| 4,562,533 | 12/1985 | Hodel et al. | 364/200 |
| 4,590,473 | 5/1986 | Burke et al. | 364/200 |
| 4,621,323 | 11/1986 | Mayhaw | 364/200 |
| 4,638,422 | 1/1989 | Rees | 364/200 |
| 4,805,098 | 2/1989 | Mills, Jr. et al. | 364/900 |
| 4,807,183 | 2/1989 | Kung et al. | 364/900 |
| 4,823,312 | 4/1989 | Michael et al. | 364/900 |
| 4,866,609 | 9/1989 | Calta | 364/200 |
| 4,922,416 | 5/1990 | Krishman et al. | 364/200 |
| 4,949,303 | 8/1990 | Hoshino et al. | 364/900 |
| 4,954,983 | 9/1990 | Klingman | 364/900 |
| 4,964,076 | 10/1990 | Shurk | 364/900 |
| 4,965,766 | 10/1990 | Fukushima | 364/900 |
| 4,965,801 | 10/1990 | DuLac | 371/40.1 |
| 4,974,189 | 11/1990 | Russon et al. | 364/900 |
| 4,989,135 | 1/1991 | Miki | 364/200 |
| 5,046,039 | 9/1991 | Ugajin et al. | 364/900 |
| 5,199,105 | 3/1993 | Michael | 395/275 |
| 5,283,877 | 2/1994 | Gastinel et al. | 395/425 |

FOREIGN PATENT DOCUMENTS

| | | | |
|---|---|---|---|
| 1151743 | 8/1983 | Canada | 340/84 |
| 60-42962 | 3/1985 | Japan . | |
| 62-164348 | 7/1987 | Japan | H04L 13/00 |

*Primary Examiner*—Christopher B. Shin
*Attorney, Agent, or Firm*—Lester H. Birnbaum

[57] ABSTRACT

Disclosed is a message oriented interface for communication between a bank controller unit and peripheral devices, such as channel units, in digital loop transmission systems. At least four registers are used for each peripheral device. Two registers are utilized to transmit control signals, and two registers are for data transmission. An additional data register can hold the last byte read by the bank controller unit in the event of an error so the byte can be re-read. The last byte of each message, which is utilized for error detection, is the exclusive OR function of the corresponding bits in all the previous bytes of the message. A service request can be asserted by a peripheral device to the Bank Controller Unit when a control signal is present in one of the registers. Means are also provided for indicating when a register is busy.

8 Claims, 3 Drawing Sheets

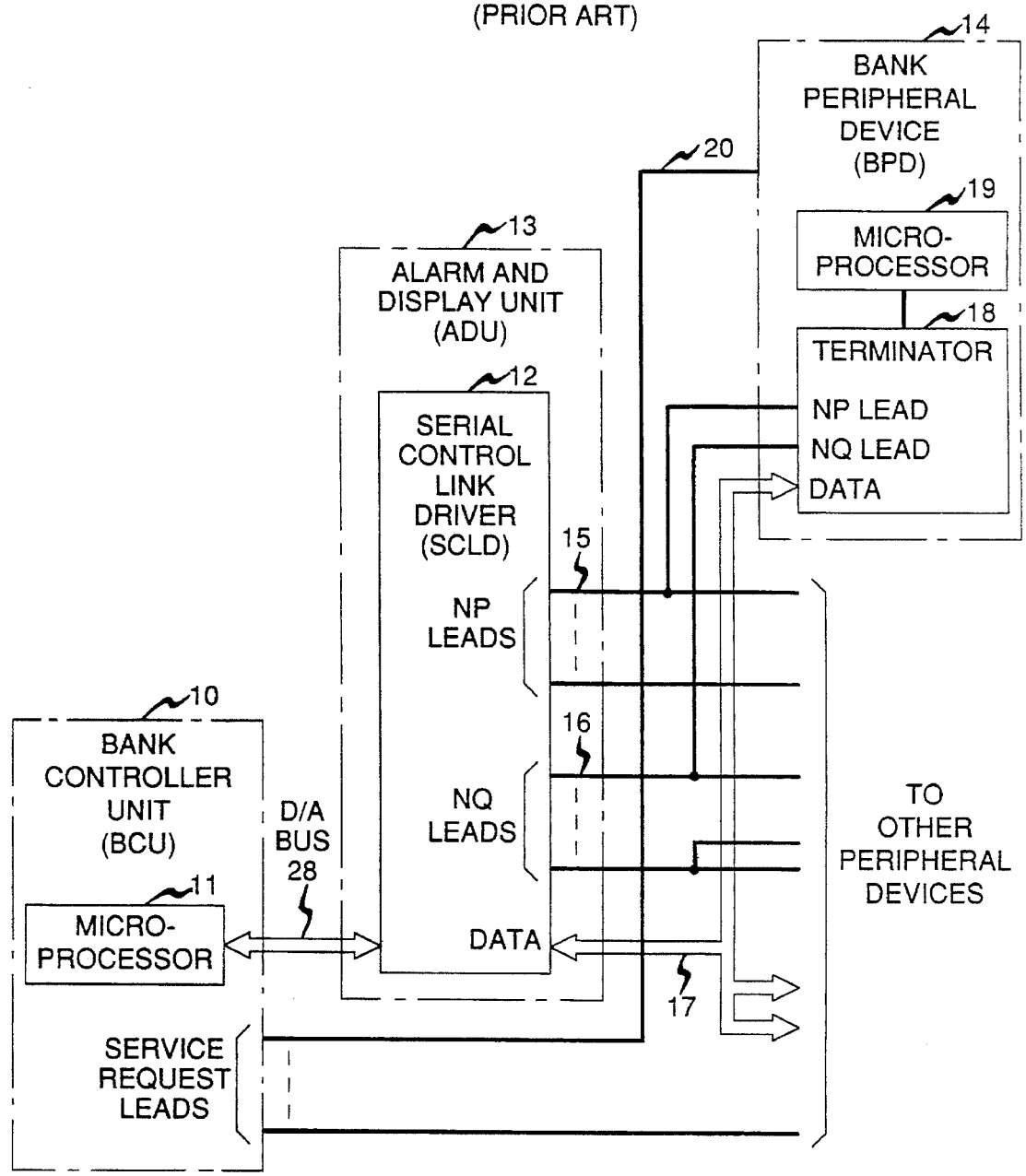

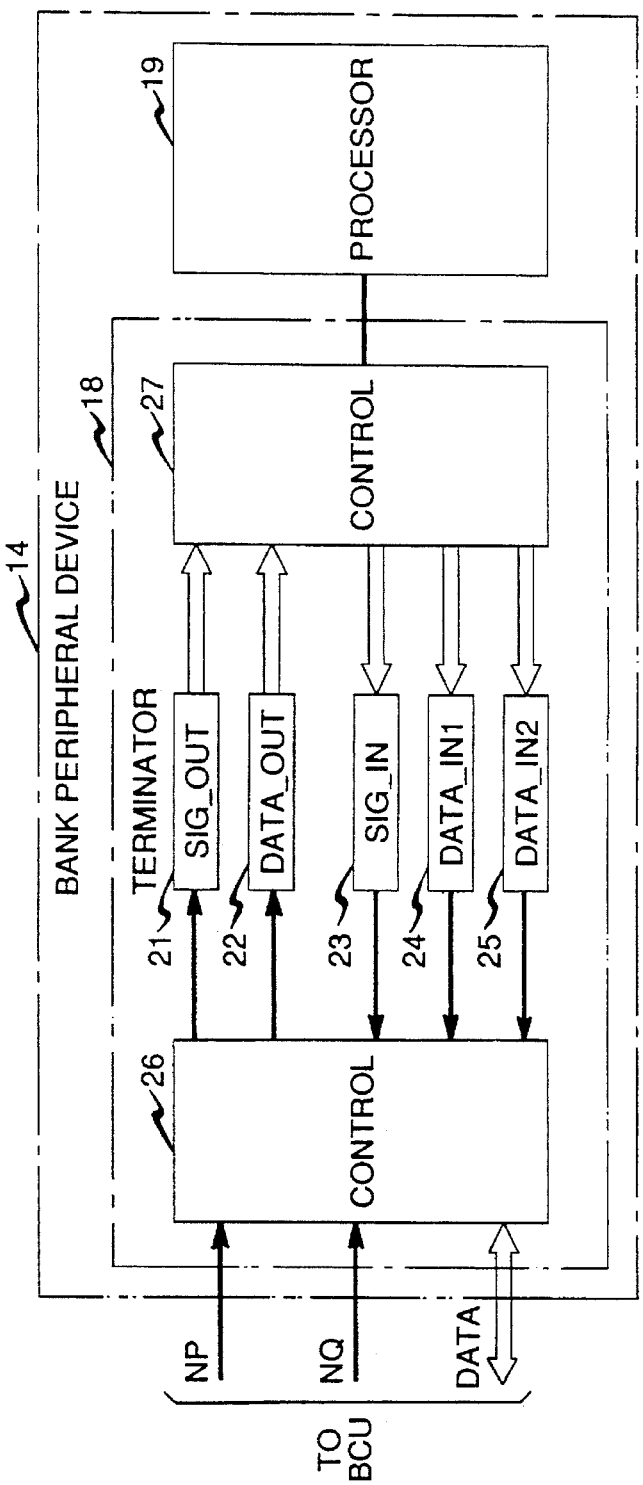

MESSAGE-ORIENTED BANK CONTROLLER INTERFACE

This application is a continuation of application Ser. No. 07/603,492, filed on Oct. 26, 1990, abandoned.

BACKGROUND OF THE INVENTION

This invention relates to message-oriented digital communication, such as that which can be utilized between a Bank Controller Unit and peripheral devices.

In present digital loop transmission technology, digital transmission occurs between a central office terminal and a remote terminal, and between a remote terminal and the subscribers. The various units of the remote terminal, such as channel units, are controlled by a Bank Controller Unit which communicates with the various peripheral units through a register-oriented interface.

The development of new features in the loop systems, such as automated channel test units (see Abrams et al, U.S. patent application Ser. No. 548,464, filed Jul. 3, 1990), and channel unit inventory control schemes, requires the transfer of large blocks of data (typically tens or hundreds of bytes). Such transfers require protection against errors which may be beyond the capacity of existing Bank Controller link protocols.

Message-oriented systems have been proposed for data communications (see, e.g., U.S. Pat. No. 4,562,533 issued to Hodel et al). It is desirable to provide a message-oriented system which will transport error-protected messages of arbitrary content and length, and which is compatible with existing Bank Controller Unit protocols.

SUMMARY OF THE INVENTION

These and other objects are achieved in accordance with the invention, which, in one aspect, is a circuit for transmitting and receiving a digital stream including multiple bytes of data and control signals, where the circuit comprises at least four registers. A first register is adapted to receive control signals which are part of the digital stream, while a second register is adapted to transmit control signals as part of the digital stream. A third register is adapted to receive data which is part of the digital stream, while a fourth register is adapted to transmit data as part of the digital stream. A fifth register may also be included to store data transmitted by the fourth register and to transmit the data in the event of an error in transmitting the data from the fourth register.

BRIEF DESCRIPTION OF THE DRAWING

These and other features of the invention are delineated in detail in the following description. In the drawing:

FIG. 1 is a block diagram illustrating a typical link between a Bank Controller Unit and a Bank Peripheral Device;

FIG. 2 is a block diagram illustrating a portion of a peripheral device in accordance with an embodiment of the invention;

FIG. 3 illustrates a typical organization of a data bit stream into a message in accordance with the same embodiment.

DETAILED DESCRIPTION

FIG. 1 is a block diagram illustrating a typical Bank Controller Unit link to peripheral devices in the central office terminal or remote terminal of a digital loop transmission system. The Bank Controller Unit (BCU), 10, includes a microprocessor, 11, which communicates to a Serial Control Link Driver (SCLD), 12, which is usually part of an Alarm and Display Unit (ADU), 13. Communication takes place over a Data/Address (D/A) bus 28. The Serial Control Link Driver, 12, communicates with each Bank Peripheral Device (BPD), such as 14, by means of two sets of leads, designated NP and NQ leads, 15 and 16, respectively, as well as a bidirectional serial data bus 17. One NP lead, one NQ lead and the data bus terminate on a Bank Control Link Terminator, e.g., 18, which is part of each peripheral device's circuitry. The NP and NQ leads jointly select the peripheral device, while the data pass over the data bus in both directions. The terminator includes registers (not shown) which can be accessed by the peripheral device's microprocessor 19.

Each peripheral device, 14, also has a service request (SR) lead, 20, which is coupled directly to the Bank Controller Unit, 10, and which is shared among several peripheral devices. This lead can provide an interrupt function during the normal BCU communication with the peripheral device.

Figure 4:
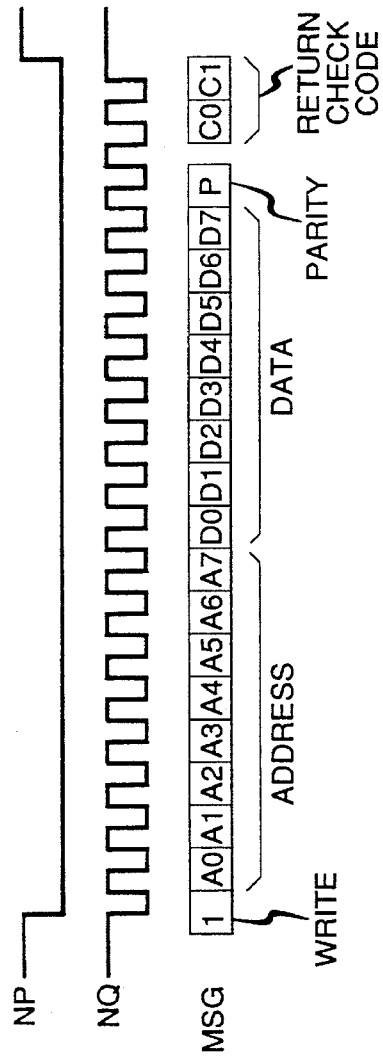
FIGS. 4 and 5 illustrate typical formats for data bit streams in accordance with the prior art.
Figure 5:
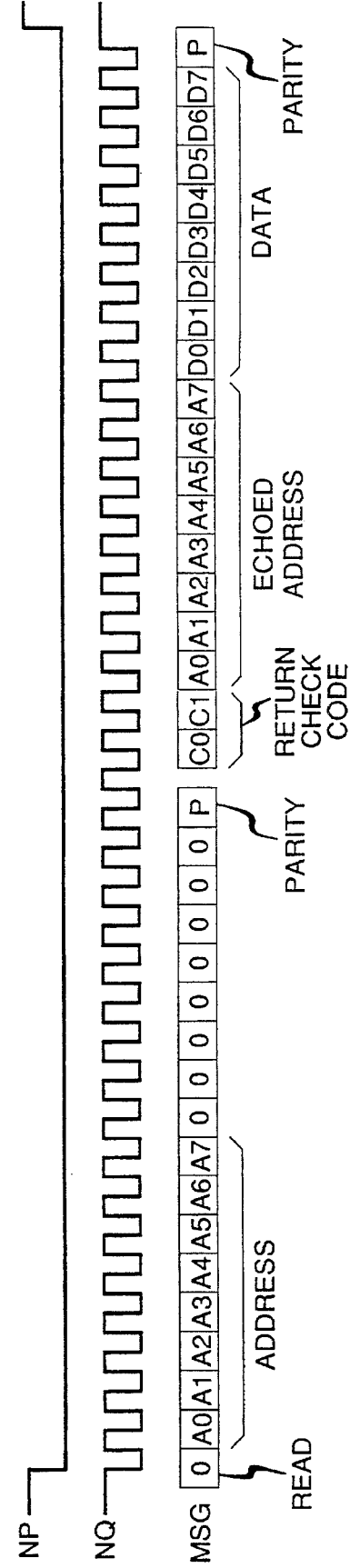

In a register-oriented system, the BCU, 10, would command the SCLD, 12, to send a message typically containing eight bits of data to a specified register of a peripheral device. The SCLD would then send the message to the terminator of the peripheral device, 14, as further illustrated in FIG. 4 along with the waveforms of the NP and NQ leads to that peripheral device. The message consisted of a read/write select bit, 16 message bits and a parity bit. The 16 message bits, as shown, were, typically, divided into an address field ($A_0$–$A_7$) that identified the register designated to receive the message, and a data field ($D_0$–$D_7$) that contained the data to be written into the register. The peripheral device would send back two check code bits ($C_0$–$C_1$) to indicate whether received and calculated parity agreed and whether the register address was valid. A check code value of {1,0} indicated parity agreement and a valid register address. A value of {0,1} indicated parity disagreement. A value of {0,0} indicated parity agreement but an invalid register address. In order to receive a message from a peripheral device, the Serial Control Link Driver (SCLD), 12, would send a message in the same format, but with the read/write select bit set to "read" and data field containing all zeros as further illustrated in FIG. 5. The peripheral device would send back two check code bits ($C_0$–$C_1$), 16 message bits, and a parity bit (P). Again, the message bits would be divided into an address field ($A_0$–$A_7$) that identified the register being read and a data field ($D_0$–$D_7$) containing the data in that register. The SCLD would also test for a match between received and calculated parity. After each read and write operation, the BCU would read a register on the SCLD, which register's content would indicate whether the operation was error-free. In the case of an error-free read operation, the BCU would read yet another register in the SCLD, which register would contain the data obtained from the peripheral device. If an error were reported, the BCU would try again. For additional error protection on a read operation, the BCU would compare the address register information in the messages transmitted and received by the SCLD.

In accordance with one feature of the invention, the terminator of each peripheral device is provided with at least four, and preferably five, registers which are dedicated to message-oriented communication with that device, as illustrated in the block diagram of FIG. 2. Each register, 21–25, in this example is 8-bits wide. The register, 21, labeled "SIG_OUT", receives outgoing control signals, while the register, 22, labeled "DATA_OUT" receives outgoing message data. ("Outgoing" refers to communication from the BCU toward the peripheral device, while "Incoming" denotes communication from the peripheral device to the BCU.) Incoming communication is handled by three registers. Register, 23, labeled "SIG_IN" receives control signals from the peripheral device, while register, 24, labeled "DATA_IN1" receives the data messages. The final, optional, register, 25, labeled "DATA_IN2" holds the last byte read by the SCLD from "DATA_IN1". In case there is an error, this byte can then be re-read by the SCLD from this auxiliary register. Control circuitry, 26 and 27, provides several functions including selecting a register, deciding whether the chosen register is to be read or written, determining whether an error has occurred in transmission from the BCU, and notifying the BCU or peripheral device's microprocessor whether a transmission error has occurred. Notifying the BCU of an error in an outgoing message can be accomplished by controlling the value of the check code, previously mentioned.

Whenever the SIG_IN register, 23, contains a control signal value other than IDLE, the peripheral device will assert a service request toward the BCU on the service request lead, 20. This feature enables the BCU to recognize a pending information transfer without periodically polling the SIG_IN registers, which polling would divert a portion of the BCU's processing capacity from other tasks. A signal value of IDLE in the SIG_IN register causes the service request to be retired. In this example, the IDLE value is zero.

In accordance with a feature of the invention, flow control is implemented by using a new value of the check code. Flow control ensures that the BCU does not send or receive data faster than the peripheral device can receive or send the data, respectively. In particular, the BCU should not write a byte into the BPD's DATA_OUT register until the peripheral device's microprocessor (19) has copied the previous byte from DATA_OUT, and the BCU should not read the BPD's DATA_IN1 register while it contains dam previously read by the BCU or the DATA_IN2 register while it does not contain current data. In any of these cases, if a register is not ready to be written or read, the check code will indicate that the register is BUSY.

Thus, in the event that the BCU attempts to access any of the data registers (22, 24 or 25) when the register is busy, the terminator will send out a newly designated value of the existing two-bit check code to indicate this fact to the BCU. That is, the newly designated value of {1,1} indicates a good parity, a valid register address, but a busy data register.

FIG. 3 illustrates the message format utilized in accordance with the invention. The message is transferred from the BCU to the peripheral device via the DATA_OUT register, 22, or from the peripheral device to the BCU via the DATA_IN1 and DATA_IN2 registers, 24 and 25, respectively. Each division (with the exception of "Information") indicates one byte of the message. The first two bytes, 31 and 32, labeled "Length (Lower)" and "Length (Upper)" indicate to the receiver the total length of the message, including the length bytes themselves and the Stop and Checksum bytes (40 and 41, respectively). The Length (Lower) byte contains the least significant eight bits of the binary number representing the length. The Length (Upper) byte contains the most significant eight bits of the number representing the length. The Physical Target (Coarse) byte, 33, designates the particular central office or remote terminal to which the message will be sent. The Physical Target (Fine) byte, 34, indicates the particular circuit card in the central office or remote terminal to which the message will be sent. The Firmware Target (Coarse) byte, 35, designates the broad category of firmware or software which will receive the message (e.g., the firmware which handles inventory control), while the Firmware Target (Fine) byte, 36, indicates the specific function of the destination firmware object (e.g., the function of accepting inventory information from a peripheral device). The Physical Source (Coarse) byte, 37, designates the central office or remote terminal from which the message is transmitted, while the Physical Source (Fine) byte indicates the circuit card within the central office or remote terminal from which the message originates.

The above-described header bytes are followed by the Information bytes, 39, which contain the payload of the message (i.e., the block of data whose transfer is the ultimate purpose of the invention). It is contemplated that the Information portion of the message may have any length from zero to 65,525 bytes, and can have any content, since the data and control signals will be handled by different registers. The information is followed by a Stop byte, 40, with a fixed value. This byte serves as pan of the error detection capability of the system by verifying that the number of bytes received in the message is equal to the number of bytes promised in the Length bytes (31 and 32). The remainder of the error detection capability is provided by the Checksum byte 41. Each bit in the Checksum byte is the exclusive OR function of the corresponding bits in all the bytes previously received in the message starting with Length byte 31 and ending with Stop byte 40. Thus, for example, if the first bits in all of the received bytes contain a total of ones which is odd, the first bit of the Checksum byte will be a one, while if the total is even, the first bit of the Checksum byte will be zero. Similarly, the exclusive OR function will be calculated for each of the other bits in the Checksum byte.

Recognizing the Stop byte, and calculating the checksum require relatively little computing power and memory. Consequently, the combination of Stop and Checksum bytes is particularly useful in digital loop systems since the peripheral devices tend to have small (8-bit) processors and limited memory space (typically less than 256 bytes of RAM and less than 4 Kbytes of ROM). Further, the use of the Stop byte in addition to the Checksum byte is desirable for reducing still further the probability of failing to detect an error in the length bytes.

Table I below indicates in more detail a typical message transfer from the Bank Controller Unit (BCU) to the Bank Peripheral Device (BPD). The first column designates the function performed by the BCU, the second column designates the register employed, and the third column designates the function performed by the BPD. The arrows between columns illustrate the direction of transfer of the control signal bytes and data bytes. The solid double arrow indicates a service request asserted by the BPD, while the dotted double arrow indicates retiring of a service request.

It will be noted that the BCU first writes a Request to Send (RTS) signal into the SIG_OUT register (see FIG. 2) which is read by the BPD. The BPD then writes a Clear to Send (CTS) signal into the SIG_IN register which is read by the BCU. The Start of Message Out (SMO) signal is then written into the SIG_OUT register by the BCU and read by the BPD. An Idle signal (IDLE) is then sent by the BPD to retire the service request. The BCU then writes the data bytes (31 to 41 inclusive in FIG. 3) one byte at a time into the DATA_OUT register, where they are read out one byte at a time by the BPD. If, at any time, the BPD responds to an offered byte with a busy check code, the BCU saves the byte the End of Message in the SIG_OUT register, and the BPD retires the service request by writing an Idle signal in the SIG_IN register.

If a BPD is unable to accept a message when the BCU writes RTS into the SIG_OUT register (e.g., if the BPD is busy with other activities), the BPD writes "BPD Busy" (BPD_BSY) into the SIG_IN register. The BCU then writes EOM into SIG_OUT, saves the message, and tries later. The BPD writes IDLE into the SIG_IN register to retire the service request.

TABLE I

| BANK CONTROLLER UNIT (BCU) | | REGISTER | | BANK PERIPHERAL DEVICE (BPD) |
|---|---|---|---|---|
| Request to Send (RTS) | ------> | SIG_OUT | ------> | Read Signal Byte |
| Read Signal Byte | <------ | SIG_IN | <-<-- | Clear to Send (CTS) |
| Start of Message Out (SMO) | ------> | SIG_OUT | ------> | Read Signal Byte |
| Ignore | <------ | SIG_IN | <-<-- | Idle (IDLE) |
| First Data Byte (Length - Lower) | ------> | DATA_OUT | ------> | Read Data Byte |
| Second Data Byte (Length - Upper) | ------> | DATA_OUT | ------> | Read Data Byte |
| o | o | | o | o |
| o | o | | o | o |
| o | o | | o | o |
| Subsequent Data Bytes | ------> | DATA_OUT | ------> | Read Data Byte |
| o | o | | o | o |
| o | o | | o | o |
| o | o | | o | o |
| Next-to-Last Data Byte (Stop) | ------> | DATA_OUT | ------> | Read Data Byte |
| Last Data Byte (Checksum) | ------> | DATA_OUT | ------> | Read Data Byte Compare Checksums |
| Read Signal Byte | <------ | SIG_IN | <-<-- | Message Acknowledge (MACK) |
| End of Message (EOM) | ------> | SIG_OUT | ------> | Read Signal Byte |
| No Action | <------ | SIG_IN | <-<-- | Idle (IDLE) | and tries again later. After the last (Checksum) byte is read, the BPD compares the Checksum byte with the checksum that the BPD has calculated as it received the message. Assuming no errors are present, the BPD acknowledges the message to the BCU by writing Message Acknowledge (MACK) in the SIG_IN register. The BCU then indicates Table II illustrates a typical message transfer from the BPD to the BCU. The BPD begins by writing the first data byte into both the DATA_IN1 and DATA_IN2 registers. The BPD then writes a Request to Send signal into the SIG_IN register where it is read by the BCU. The BCU responds by writing a Start of Message In signal into the SIG_OUT register which is read by the BPD. An Idle signal is then sent by the BPD to retire the service request. The BCU then reads the first Data byte which was previously written into the DATA_IN1 register. Subsequently, the BPD writes the remainder of the Data bytes, one byte at a time, into the DATA_IN1 register. As soon as the BCU attempts to read a new byte from DATA_IN1, the BPD will copy the byte in DATA_IN2 is not read, it will merely be replaced by the next byte. After reading the last byte, the BCU will compare the Checksum byte with the checksum that the BCU has calculated as it received the message, and, if there is agreement, send a message acknowledgment by writing Message Acknowledge (MACK) into the SIG_OUT register.

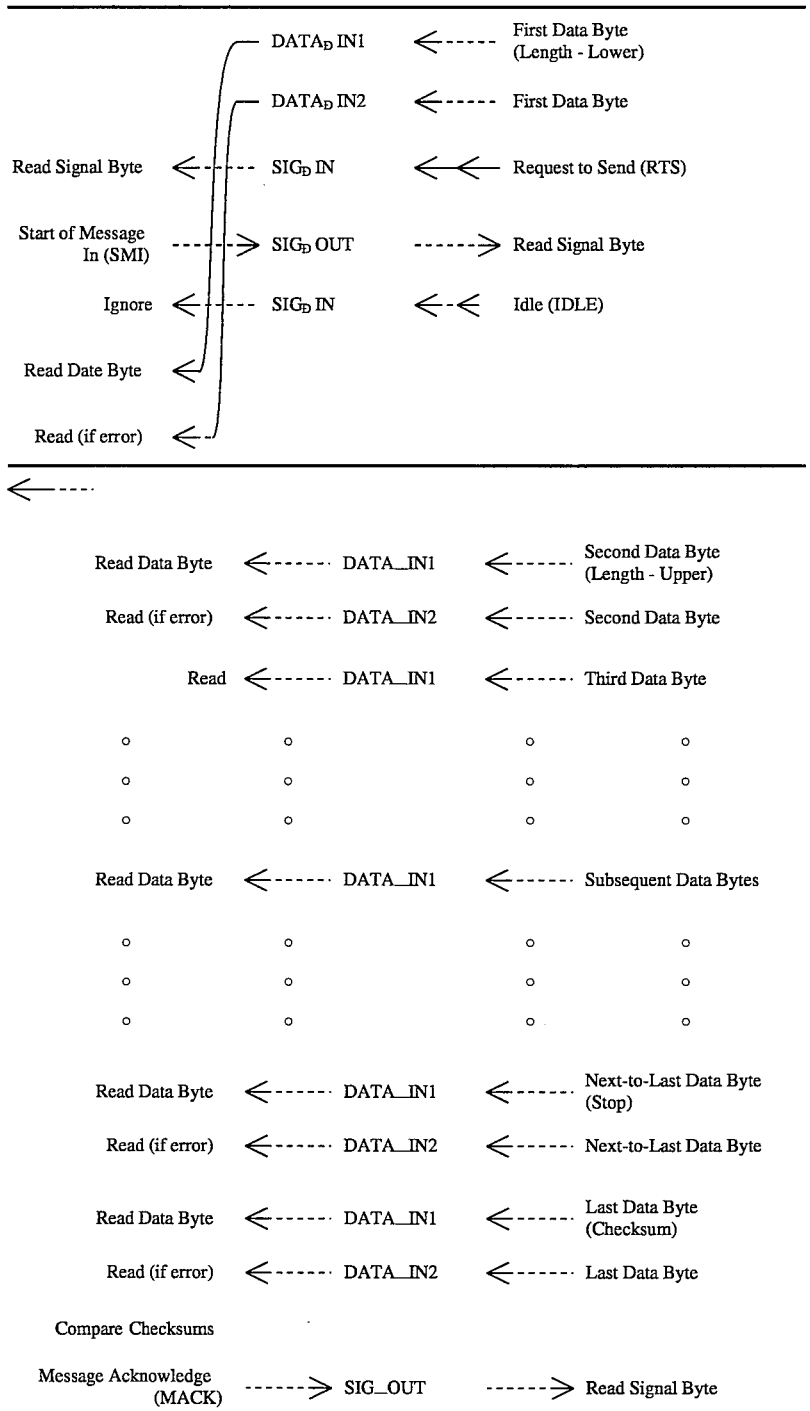

TABLE II new byte into DATA_IN2. The BCU reads the Data bytes from DATA_IN1 as they are written therein, and, if an error is detected, will re-read a byte from DATA_IN2. If a Data It will be appreciated that this byte transfer protocol permits a message of any length from 10 to 65,535 bytes containing from zero to 65,525 Information bytes, and in no way restricts the content of an Information byte.

At any time during message transfer, either the BCU or BPD can abort by issuing an appropriate signal, i.e., the sender can issue an End of Message (EOM) signal or the receiver can issue a Message Transmit Abort (MTA) signal.

If the receiver of a message detects a wrong value in the STOP byte, or finds a checksum disagreement, the receiver sends a "Message Transmission Error" (MTE) signal to the sender via the SIG_IN or SIG_OUT register, as appropriate. The sender may then re-transmit the message.

Various modifications of the invention will become apparent to those skilled in the art. For example, although a Bank Controller link to peripheral devices has been described, the invention could be used for other types of metallic distribution control links. All such variations which basically rely on the teachings through which the invention has advanced the art are properly considered within the scope of the invention.

We claim:

1. In a bank peripheral device for use in a digital loop transmission system, a circuit for transmitting and receiving digital streams including multiple-byte data messages and control signals over a bank controller link comprising a single data bus between the peripheral device and a bank controller in said loop wherein the data messages comprise a plurality of header bytes, a plurality of information bytes, a Stop byte and a Checksum byte, each byte including a number of bit positions, the Checksum byte comprising bits which are an exclusive OR function of all bits in the same bit position in the previous bytes of the data message, said circuit comprising:

a first control circuit adapted for coupling to the data bus and for transmitting multiple-byte messages in a transmit mode and receiving multiple-byte messages in a receive mode such that the data messages and control signals are transmitted and received over the single data bus;

a first register electrically coupled to the first control circuit and adapted to receive a request to send signal, a start of message out signal, and an end of message signal from the data bus in the receive mode and receive a start of message in signal and a message acknowledgment signal in the transmit mode;

a second control circuit;

a second register electrically coupled to said second control circuit and adapted to transmit a clear to send signal and a message acknowledgment signal on the bus in the receive mode and to transmit a request to send signal in the transmit mode;

a third register electrically coupled to said first control circuit and adapted to receive a first multiple-byte data message a byte at a time which is part of a received digital stream from the bus subsequent to the sending of the clear to send signal and the receipt of the start of message out signal;

a fourth register electrically coupled to said second control circuit and adapted to transmit a second multiple-byte data message generated by the peripheral device as part of a transmitted digital stream a byte at a time onto the bus subsequent to the receipt of the start of message in signal;

the second and fourth registers also being adapted for connection to the single data bus through the first control circuit in order to be able to transmit the multiple-byte data messages and control signals as part of the transmitted digital stream on the bus.

2. The circuit according to claim 1 further comprising a fifth register electrically coupled to said second control circuit in order to store data transmitted by said fourth register and also coupled to said first control circuit in order to transmit said data in case of an error in transmitting the data from the fourth register.

3. A digital loop transmission system comprising:

a Bank Controller Unit; and a plurality of peripheral devices which communicate with said Bank Controller Unit by digital streams including control signals and multiple-byte data messages on a common data bus between the peripheral device and the bank controller which messages are received in a receive mode and transmitted in a transmit mode by the peripheral devices, the data messages comprising a plurality of header bytes, a plurality of information bytes, a Stop byte and a Checksum byte, each byte including a number of bit positions, the Checksum byte comprising bits which are an exclusive OR function of all bits in the same bit position in the previous bytes of the data message, each of said peripheral devices comprising:

a first control circuit coupled to the data bus and adapted for transmitting in the transmit mode and receiving in the receive mode the multiple-byte data messages such that the data messages and control signals are transmitted and received over the single data bus;

a first register electrically coupled to the first control circuit and adapted to receive a request to send signal from the data bus in the receive mode and receive a start of message in signal and a message acknowledgment signal in the transmit mode;

a second control circuit;

a second register electrically coupled to said second control circuit and adapted to transmit a clear to send signal and a message acknowledgment signal in the receive mode and to transmit a request to send signal in the transmit mode;

a third register electrically coupled to said first control circuit and adapted to receive a first multiple-byte data message a byte at a time which is part of a received digital stream from the bus subsequent to the sending of the clear to send signal and the receipt of the start of message out signal;

a fourth register electrically coupled to said second control circuit and adapted to transmit a second multiple-byte data message generated by the peripheral device as part of a transmitted digital stream a byte at a time onto the bus subsequent to the receipt of the start of message signal;

the second and fourth registers also being connected to the single data bus through the first control circuit in order to be able to transmit the multiple-byte data messages and control signals as part of the transmitted digital stream onto the bus.

4. The circuit according to claim 3 further comprising a fifth register connected to said second control circuit in order to store data messages transmitted by said fourth register and to transmit said data messages in case an error in transmitting the data from the fourth register is detected by the Bank Controller Unit.

5. The system according to claim 3 wherein the peripheral devices are channel units.

6. The system according to claim 3 wherein the data messages have a byte length within the range 10–65,535.

7. The system according to claim 3 further comprising conductive means coupled to each of the peripheral devices for asserting a service request to the Bank Controller Unit when an appropriate signal is in the second register.

8. The system according to claim 3 wherein the first control circuit includes means for sending to the Bank Controller Unit a predetermined two-bit signal indicating when one of the registers is busy.

* * * * *